US006654016B1

(12) United States Patent
Hobbs

(10) Patent No.: US 6,654,016 B1
(45) Date of Patent: Nov. 25, 2003

(54) SYSTEM AND METHOD FOR EFFICIENTLY CREATING SPLINES

(75) Inventor: Craig Alan Hobbs, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 159 days.

(21) Appl. No.: 09/998,101

(22) Filed: Nov. 30, 2001

(51) Int. Cl.[7] .............................................. G06T 11/20
(52) U.S. Cl. ....................................................... 345/442
(58) Field of Search ................................. 345/440, 441, 345/442

(56) References Cited

U.S. PATENT DOCUMENTS 4,953,106 A * 8/1990 Gansner et al. ............. 345/441
5,594,855 A * 1/1997 Von Her, II et al. ........ 345/442
6,278,445 B1 * 8/2001 Tanaka et al. .............. 345/178
6,483,509 B1 * 11/2002 Rabenhorst ................. 345/442

* cited by examiner

*Primary Examiner*—Matthew Luu
(74) *Attorney, Agent, or Firm*—King & Spalding LLP

(57) ABSTRACT

A computer-implemented method and system for efficiently creating splines. Drawing software modules can use splines to connect objects in a drawing or flow chart. Splines are defined and manipulated by a group of points and equations that are used to calculate the position of the spline. To create complex or precise splines, drawing software modules add control points to the minimum number of control points needed to create the spline. The invention improves upon existing methods of creating splines by examining the control points and eliminating unnecessary ones. By eliminating redundant control points, the invention reduces the processing work that must be done to calculate the position of the spline and improves the performance of the drawing software module.

25 Claims, 8 Drawing Sheets

SYSTEM AND METHOD FOR EFFICIENTLY CREATING SPLINES

RELATED APPLICATION

The present application references and incorporates herein a related U.S. non-provisional application Ser. No. 09/998,102 entitled System and Method for Placing Splines Using Refinement and Obstacle Avoidance Techniques, filed concurrently herewith.

TECHNICAL FIELD

The present invention is generally directed to a software module used for drawing diagrams. More specifically, the present invention provides a system and method for efficiently creating splines by eliminating unnecessary control points.

BACKGROUND OF THE INVENTION

Computer software modules that enable users to produce drawings are widely available. These drawing software modules typically have functions that allow users to place and manipulate shapes and lines on a display screen to create a variety of drawings including pictures, charts, diagrams, and figures. After producing the drawings with the software module, users can store the drawings electronically, transmit them electronically, or print hard copies of the drawings.

One common use for drawing software modules is to create diagrams and flowcharts that represent structures and processes. The diagrams and flowcharts often consist of objects of varying shapes that represent elements of a structure or steps in a process. The objects can be placed on the electronic "page" either automatically by a function within the software module or they can be "drawn" by a user with a pointing device such as a mouse. The objects on the electronic page can then be connected in a variety of ways to show how they are inter-related. Traditionally, objects could be connected using a single, straight line or multiple, orthogonal line segments. The advantage of orthogonal line segments is that the paths of the connections could connect two objects while avoiding unwanted intersections with other objects on the page.

More recently, some commercially available drawing software modules enabled objects to be connected with curves or splines. A spline is generally defined as a smooth curve that actually or approximately connects a set of points, although it may not intersect all of the points. Typically, Bezier splines are used by drawing software modules to draw curves connecting shapes on an electronic page. A Bezier spline is a well-known type of curve generally defined by four points, often referred to as the control points, and a set of polynomial equations. The drawing software module creates the spline using the coordinates of the control points and the set of polynomial equations.

Although drawing software modules have the ability to draw splines, there are several limitations concerning the accuracy and precision with which the splines are placed on an electronic document. The primary method for improving the accuracy and precision of placing splines is to increase the number of control points that define the spline. That is, additional control points can assist in the "fine tuning" of a spline's position. Although an increased number of control points allows for more refined manipulation of the spline, it also increases the number of calculations needed to create the spline. Increasing the calculations used in creating the spline slows the processing speed and detracts from the overall performance of the drawing software module.

In view of the foregoing, there is a need in the art for a method that will enable drawing software modules to efficiently create splines. Specifically, a need exists to be able to differentiate between control points that fine tune the spline and those that are redundant. Redundant control points have little or no effect on the position of the spline. A further need exists to isolate the redundant points so that they will not be used in the calculations performed to create the spline. Reducing unneeded control points supports more efficient processing.

SUMMARY OF THE INVENTION

The present invention is generally directed to a software module for placing splines in an electronic diagram. The present invention improves upon existing drawing software modules by eliminating unnecessary control points before drawing or modifying the spline. Specifically, the exemplary embodiment described herein uses two methods to identify unneeded points. One method identifies newly added control points that are useless and have no effect on the spline. The other method locates pre-existing control points that have been replaced by newer control points and are no longer needed. Once redundant control points are identified and isolated, the spline can be created using only the necessary control points. By excluding unnecessary control points, the calculations for creating the spline are reduced and the drawing software module can operate more efficiently.

In one aspect, the invention comprises a computer-implemented method for efficiently creating a spline. Beginning with a source object and target object connected by orthogonal line segments, the drawing software module can place control points that define the position of a proposed spline. The position of the proposed spline can be modified for a more complex or precise path by adding control points along the line segments. Typically, control points are continually added on a heuristic basis until the spline traces the desired path. Added control points can be examined in conjunction with adjacent control points to determine whether they affect the position of the spline. If an added point does not affect the spline, it can be designated useless and isolated from the calculations of the position of the revised spline. Similarly, existing control points that are replaced by newly added control points can be identified and isolated from the calculation of the revised spline. Once the useless and replaced control points are isolated, the revised spline is created using only relevant control points. Reducing the number of control points improves the performance of the drawing software module.

In another aspect, the invention comprises an efficient method for the filtering of useless control points in order to increase the processing speed for placing the spline. A drawing software module can place initial control points that define a spline along a line segment on an electronic page. When additional control points are added to the initial control points to modify the path of the spline, the resulting group of control points can contain redundancies. The adding of points can result in an excess of points that unnecessarily slows the calculation of the ultimate spline. The drawing software module can analyze newly added control points to determine whether they have little or no effect on the position of the spline. Useless control points can be filtered out of the group of control points used to create the spline.

The invention further provides an efficient method for creating a spline by filtering out replaced control points from those used to calculate the position of the spline. The spline can be created adjacent to a line segment on which control points are placed. As new control points are added to the line segment to adjust the position of the spline, the initial control points can be analyzed to determine whether they have been replaced. Replaced control points can be filtered out of the calculation of the revised spline. The filtering process reduces the number of calculations that must be performed and enables the drawing software module to calculate the position of the revised spline more quickly.

These and other aspects of the invention will be described in the detailed description in connection with the drawing set and claim set.

DETAILED DESCRIPTION OF THE EXEMPLARY EMBODIMENTS

Figure 1:
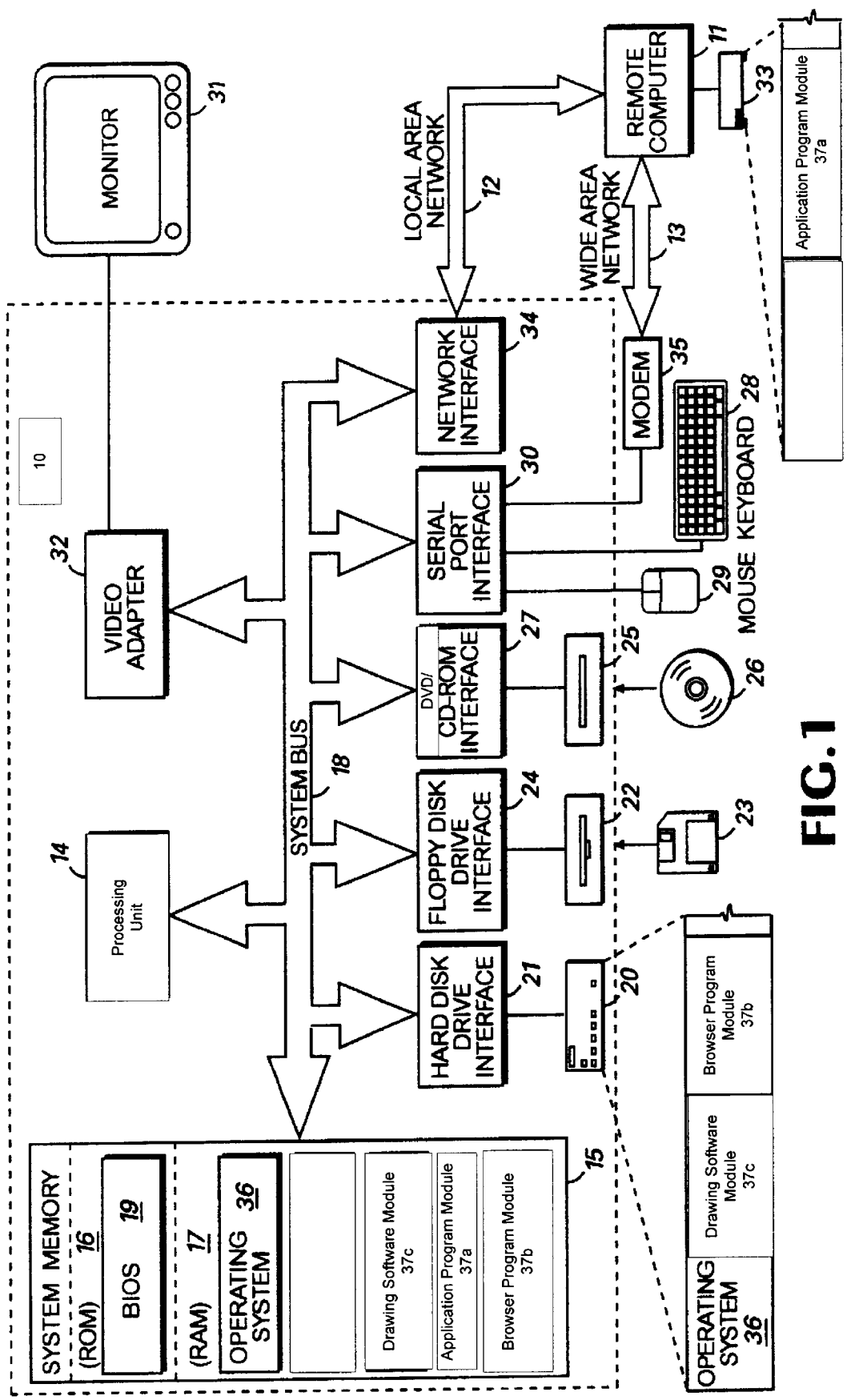
FIG. 1 is a functional block diagram illustrating the operating environment for an exemplary embodiment of the present invention.

The present invention improves the ability of drawing software modules to draw spline connectors. Specifically, the present invention utilizes control point filtering techniques to efficiently create spline connectors. Conventional drawing software modules use control points to create splines. In order to improve the complexity and precision with which splines are drawn, additional control points can be added to the minimum number used to define the spline. The addition of control points can occur in a variety of ways, but it may also produce redundant control points. Redundant control points are points that are essentially replaced by added control points or have minimal or no effect on the spline. These redundant control points only serve to slow the performance of the drawing software module by adding unnecessary calculations. Accordingly, the present invention supports methods for identifying redundant control points. By isolating the redundant control points from the calculations, only the significant points are used in the calculations for creating the spline. Identifying and isolating the redundant control points enables the drawing software module to perform faster.

Although the exemplary embodiments will be generally described in the context of a software module and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations by conventional computer components, including processing units, memory storage devices, display devices and input devices. These processes and operations may utilize conventional computer components in a distributed computing environment, including remote file servers, remote computer servers, and remote memory storage devices. Each of these conventional distributed computing components is accessible by a processing unit via a communications network.

The processes and operations performed by the computer include the manipulation of signals by a processing unit or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention includes a computer program which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote server 11. The logical connections between the personal computer 10 and the remote server 11 are represented by a local area network 12 and a wide area network 13. Those of ordinary skill in the art will recognize that in this client/server configuration, the remote server 11 may function as a file server or computer server.

The personal computer 10 includes a processing unit 14, such as "PENTIUM" microprocessors manufactured by Intel Corporation of Santa Clara, Calif. The personal computer also includes system memory 15, including read only memory (ROM) 16 and random access memory (RAM) 17, which is connected to the processor 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote server 11 in this networked environment is connected to a remote memory storage device 33. This remote memory storage device 33 is typically a large capacity device such as a hard disk drive, CD-ROM or DVD drive, magneto-optical drive or the like. Those skilled in the art will understand that program modules, such as an application program module 37*a*, are provided to the remote server 11 via computer-readable media. The personal computer 10 is connected to the remote server 11 by a network interface 34, which is used to communicate over the local area network 12.

In an alternative embodiment, the personal computer 10 is also connected to the remote server 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 10, thus communicating directly via the system bus 18. It is important to note that connection to the remote server 11 via both the local area network 12 and the wide area network 13 is not required, but merely illustrates alternative methods of providing a communication path between the personal computer 10 and the remote server 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules, such as an operating system 36, an application program module 37*a*, a browser program module 37*b*, a drawing software module 37*c*, and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs.

Figure 2:
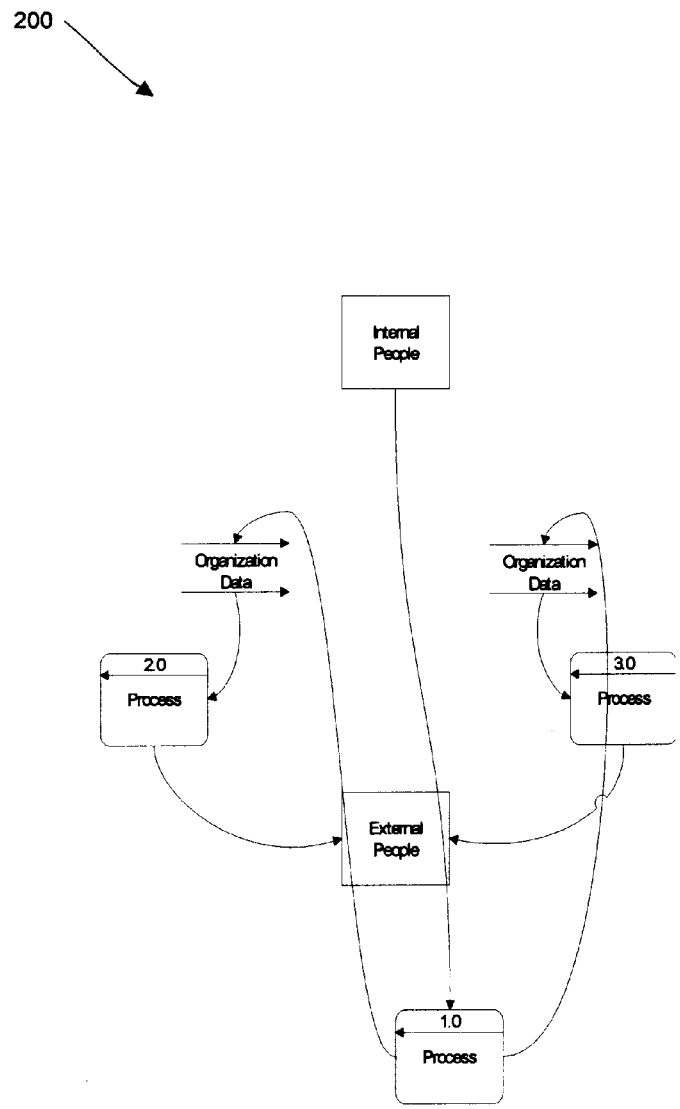
FIG. 2 is an exemplary diagram illustrating the limitations of conventional drawing software modules that draw splines with only the minimum number of control points.

Referring to FIG. 2, an exemplary illustration 200 of a flow chart diagram created with a conventional drawing software module is shown. The spline connectors in the flow chart diagram shown in FIG. 2 were created using only the minimum number of required control points to define each spline. FIG. 2 shows the limited capabilities of the drawing software module when additional control points are not used.

Figure 3A:
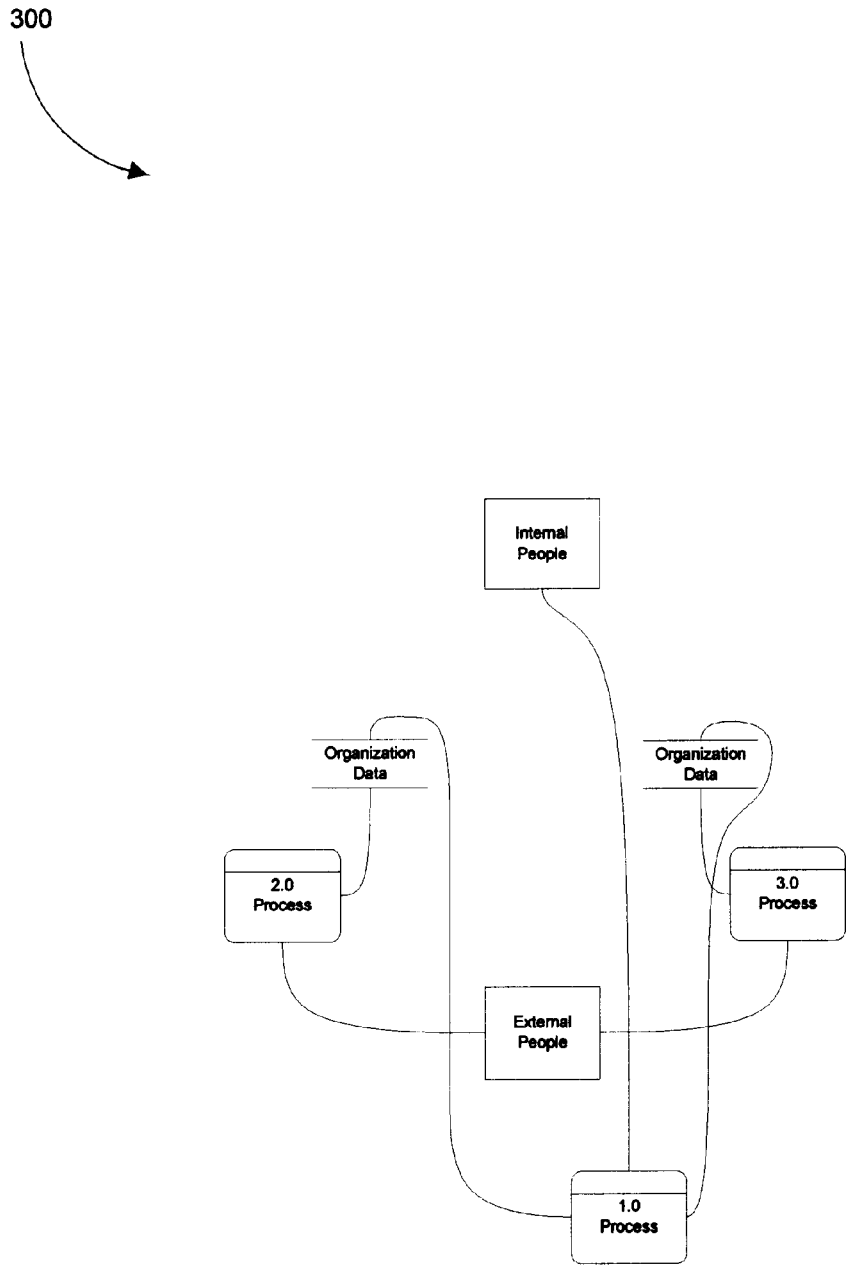
FIG. 3A is an exemplary diagram illustrating a flow chart created using additional control points to refine the placement of the spline.
Figure 3B:
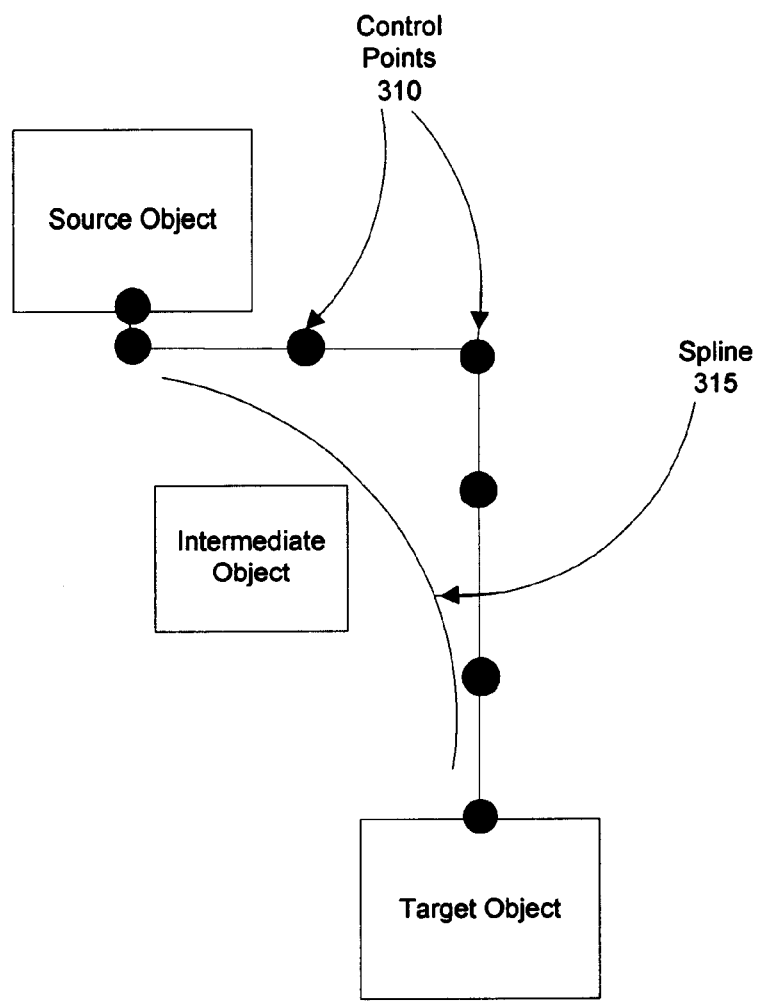
FIG. 3B is an exemplary diagram illustrating orthogonal line segments with control points used to create a spline.

In contrast, FIG. 3A is an exemplary illustration 300 of a similar flow chart created using additional control points to refine the spline connectors. The splines of FIG. 3A are manipulated by the additional control points so that they can be placed with greater precision. The result is to produce a more clear flow chart with fewer unintended and distracting intersections. FIG. 3B is an exemplary illustration of control points that can be used to manipulate a spline connector. As FIG. 3B shows, the control points 310 are typically placed along orthogonal line segments connecting the source and target object. The orthogonal line segments may or may not be displayed to the user. In the example in FIG. 3B, control points have been added to adjust the position of the spline 315 so that it avoids intersecting the intermediate object.

Figure 4:
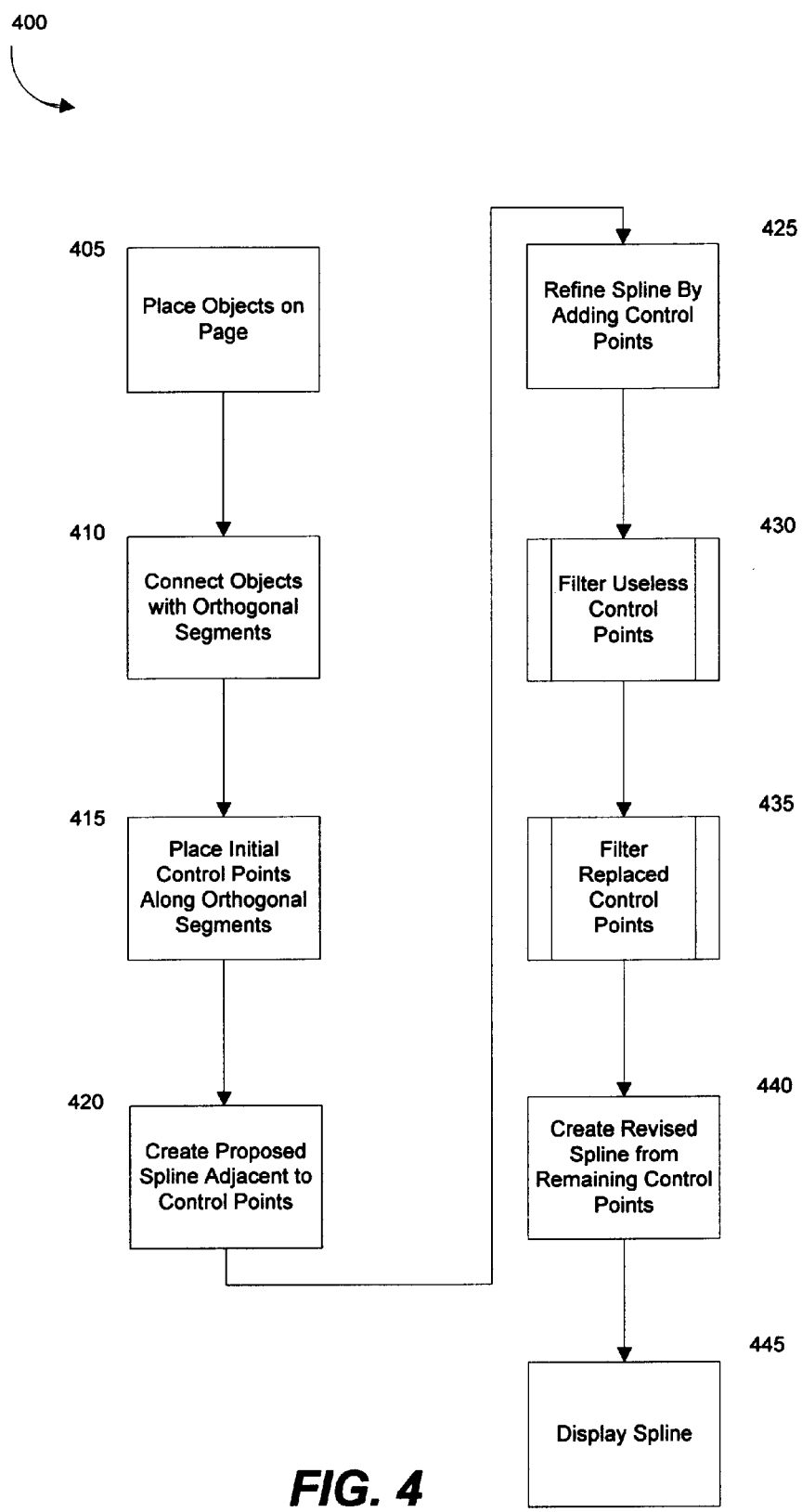
FIG. 4 is a logic flow diagram illustrating an overview of an exemplary process for drawing splines using control point elimination techniques.

Referring to FIG. 4, an exemplary process 400 is illustrated for placing a spline on a page with control point elimination techniques. Step 405 begins with the user placing objects on the electronic drawing page. The user can either draw the objects with a freehand tool or select objects from a template provided by the drawing software module. The objects are typically two-dimensional boxes and other shapes that represent steps in a process flowchart or elements in a schematic diagram. In order to connect two selected objects with a spline, the drawing software module 37*c* first connects the selected objects with orthogonal line segments in step 410. The orthogonal line segments may or may not be displayed to the user. In step 415, the drawing software module 37*c* places initial control points along the orthogonal line segments. The coordinates of the initial control points are used to define the spline. A proposed spline is created adjacent to the orthogonal line segments using the control points in step 420.

If the user wishes to manipulate or refine the position of the proposed spline, the drawing software module 37*c* can add one or more control points along the orthogonal line segments in step 425. Advantageous methods for manipulating and refining a spline are described in U.S. nonprovisional patent application Ser. No. 09/998,102 entitled System and Method for Placing Splines Using Refinement and Obstacle Avoidance Techniques, filed concurrently herewith, and also assigned to the Microsoft Corporation.

Control points are typically added on an ad hoc basis until the proposed spline is in the position desired by the user. This approach to adjusting the spline can result in redundant control points. Redundant control points can be classified as useless or replaced. Useless control points are added control points that have little or no effect on the position of the spline. Replaced control points are existing points that have little or no effect on the position of the spline because of subsequently placed control, points that are nearby. Steps 430 and 435 ensure that control points are added in an efficient manner by filtering useless and replaced control points. Filtering redundant points reduces the number of calculations that must be performed to create the spline and improves the performance of the drawing software module 37c.

In step 440, the drawing software module creates the revised spline from the control points remaining after the filtering process. In the exemplary embodiment illustrated in FIG. 4, filtering processes for both useless and replaced control points are shown. In alternative embodiments of the invention, the two filtering processes can occur in the reverse order or only one of the two filtering processes may be performed. In step 445, the drawing software module 37c displays the spline connecting a source object and target object. In alternative embodiments of the invention the filtering process can be performed on segments of a spline and can be repeated for multiple splines.

Figure 5:
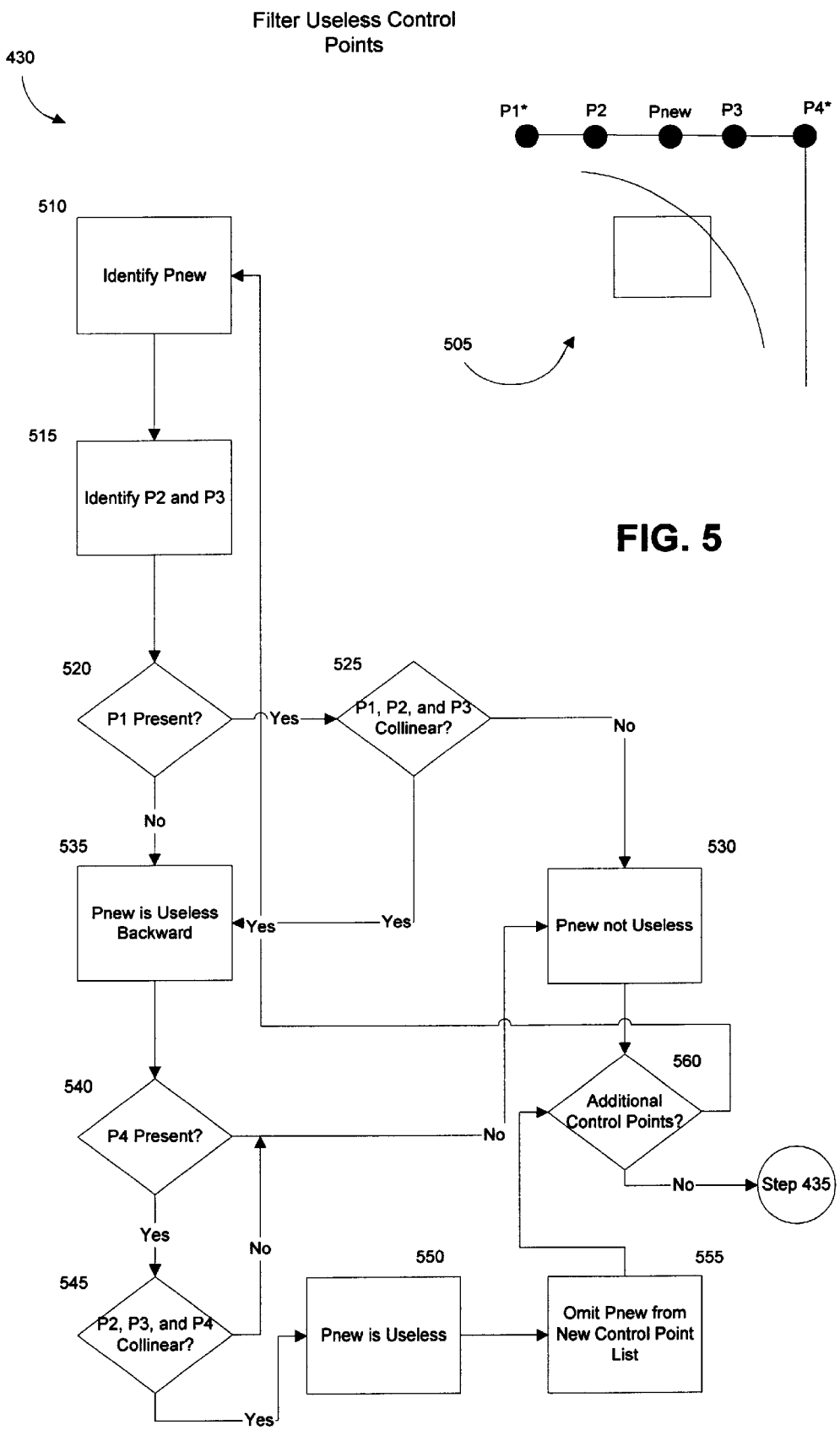
FIG. 5 is a logic flow diagram illustrating an exemplary process for eliminating useless control points.
Figure 6:
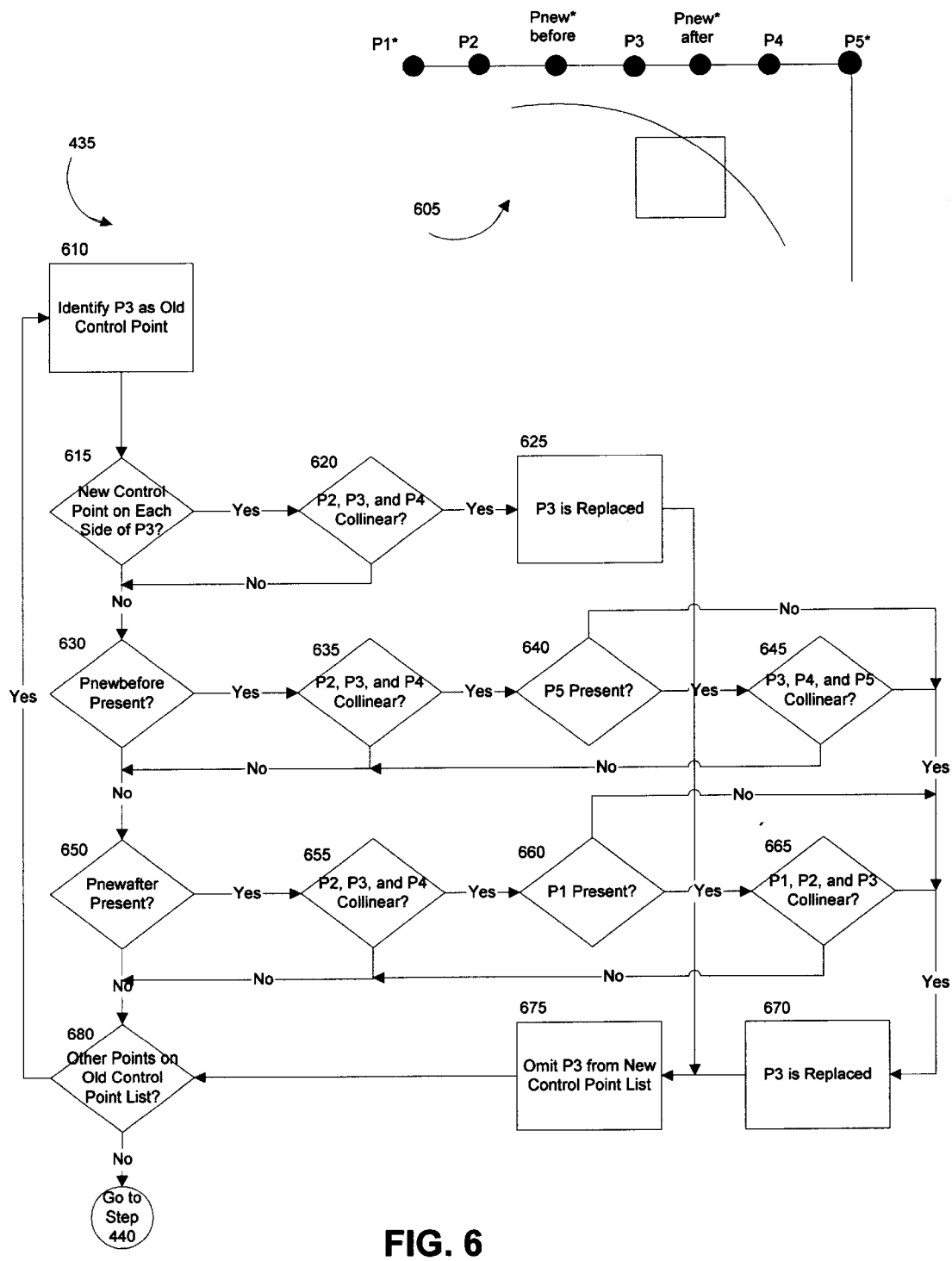
FIG. 6 is a logic flow diagram illustrating an exemplary process for eliminating replaced control points.

FIG. 5 and FIG. 6 represent exemplary methods for improving the efficiency of drawing splines by eliminating unneeded control points. Fewer control points translates into fewer calculations used in creating the spline. In alternative embodiments of the present invention, other methods could be used to reduce the number of control points. FIG. 5 illustrates an exemplary method for determining whether a new control point corresponding to an intercept point is redundant because there are already existing control points, also called old control points, in the same vicinity on the orthogonal line segment. In steps 510 and 515, the drawing software module 37c identifies a new control point, Pnew, located between existing control points, P2 and P3, as shown in the exemplary diagram 505. It is assumed that P2, Pnew, and P3 are collinear because new control points are typically inserted between existing collinear control points.

Figure 7:
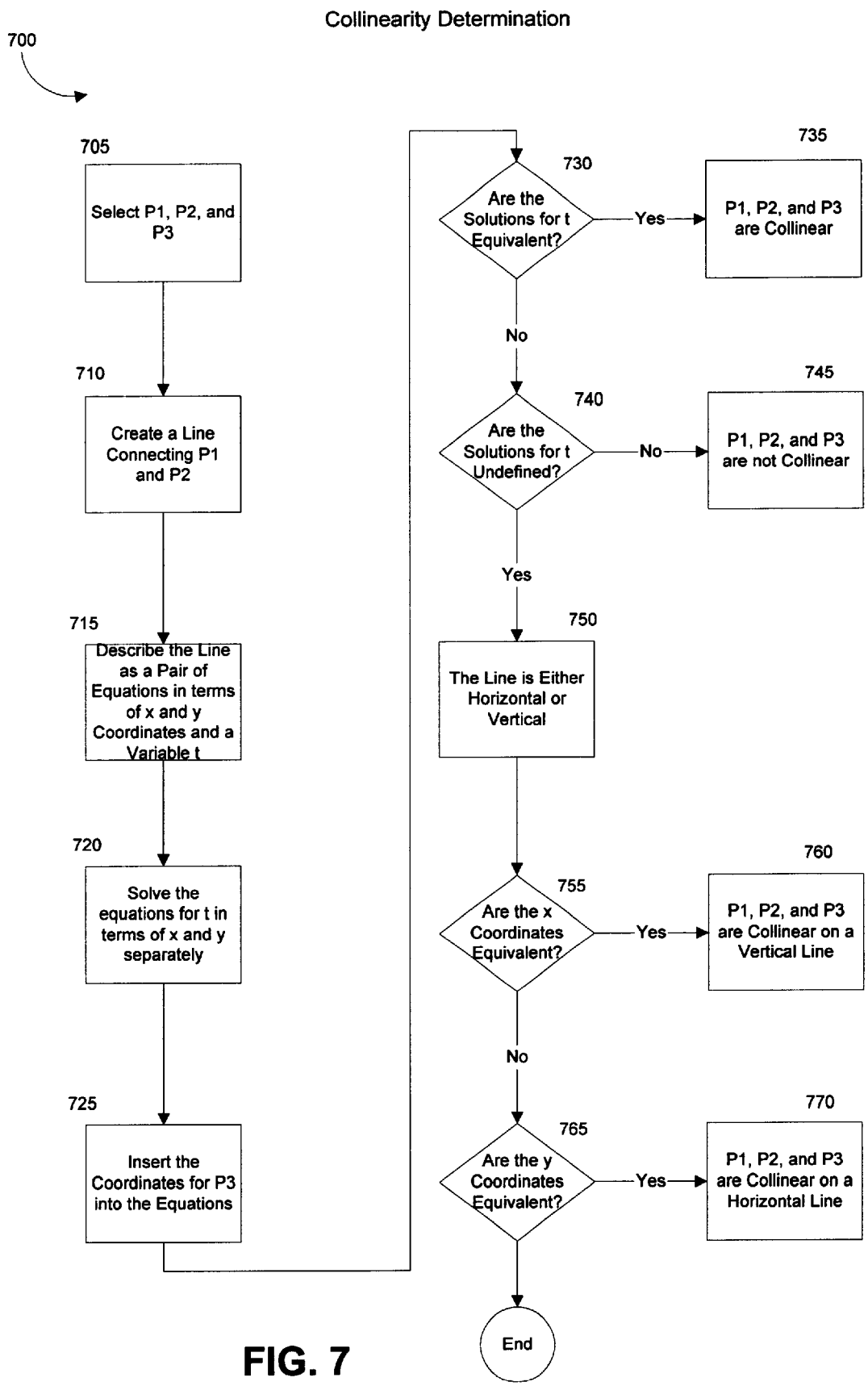
FIG. 7 is a logic flow diagram illustrating an exemplary process for determining whether a series of points are collinear.

In step 520, the drawing software module 37c looks for an additional point adjacent to P2, called P1. In the exemplary diagram 505, P1 and P2 are marked with an asterisk to indicate that they may or may not be present. If P1 is not present, in step 535, Pnew is considered useless to the left-hand side of the spline shown in the exemplary diagram 505. If P1 is present, but it is collinear with P2 and P3 in step 525, then Pnew is considered useless to the left-hand side of the spline shown in the exemplary diagram 505. An exemplary process for determining whether three points are collinear is illustrated in FIG. 7 and will be discussed in greater detail below. If P1 is present and not collinear with P2 and P3, then Pnew is not considered useless in step 530. In other words, if P1 is present and is not collinear with P2 and P3, then Pnew will affect the position of the spline on the left-hand portion of the diagram 505.

Turning to the right-hand side of the diagram 505, in step 540, the drawing software module 37c examines whether P4 exists adjacent to P3. If P4 is not present, or P4 is present but not collinear with P2 and P3, Pnew is not useless in step 530. If P4 is present and collinear with P2 and P3, Pnew is considered useless to the entire spline in step 550. In step 555, Pnew is omitted from the new control point list so that it will not be used in calculating the new position of the spline. In step 560, if there are additional control points to be examined, the filtering process 430 returns to step 510. If there are no other control points to be examined for uselessness, the "No" branch is followed to step 435 of FIG. 4.

FIG. 6 illustrates an exemplary method for determining whether an existing control point has been replaced by subsequently placed control points. Referring to the exemplary diagram 605 shown in FIG. 6, this filtering process examines whether the effect of P3 on the spline has been replaced by the two new points designated Pnewbefore and Pnewafter. Pnewbefore, Pnewafter, P1, and P5 are marked with an asterisk in diagram 605 because they may or may not be present. The drawing software module 37c assumes that P2, Pnewbefore, and P3 are collinear. Similarly, it is assumed that P3, Pnewafter, and P4 are collinear.

Once P3 has been identified in step 610, the drawing software module 37c examines whether there are new control points on either side of P3. If there is a new control point on each side of P3, in step 615, and P2, P3, and P4 are collinear, P3 is designated as replaced in step 625. If there is not a new control point on each side of P3, a query is made for Pnewbefore in step 630. If Pnewbefore is present and P2, P3, P4, and P5 are collinear, in steps 635 and 645, P3 is designated as replaced in step 670. In the case where there is no P5 in step 640, but P2, P3, and P4 are collinear, P3 is still replaced in step 670. If there is an absence of collinearity, the drawing software module 37c proceeds to step 650 and determines whether Pnewafter is present. If Pnewafter is present and P1, P2, P3, and P4 are collinear, in steps 655 and 665, P3 is designated as replaced in step 670. In the case where there is no P1, in step 660, but P2, P3, and P4 are collinear, P3 is replaced in step 670. If there is no collinearity among the points, P3 will not be replaced.

After P3 is designated as replaced, it will be omitted from the new control point list in step 675. In situations where P3 is replaced, its effect on the spline is essentially nullified by the other control points on the line segment. In step 680, the drawing software module 37c determines whether there are other control points to examine. If there are no other control points, the process returns to step 440 where the revised spline is created from the new control point list. If there are other control points to be examined, the filtering process 435 returns to step 610. In alternative embodiments of the present invention other criteria can be used to identify and filter control points that are redundant.

Referring to FIG. 7, an exemplary method 700 for determining whether three points are collinear is illustrated. The collinearity determination is referenced in the filtering procedures described in FIGS. 5 and 6. In alternative embodiments of the present invention other methods can be used to determine whether three points are collinear. In step 705, three points P1, P2, and P3 are selected for analysis. In step 710, a line connecting P1 and P2 is created in terms of t, where t=0 at P1 and t=1 at P2. The line connecting P1 and P2 can be expressed in terms of t and the x coordinates and y coordinates separately in step 715. Solving the equations in terms of t, in step 720, and inserting the coordinates for P3, in step 725, produces two solutions for t. If the solutions are equivalent, or nearly equivalent, P1, P2, and P3 are collinear in step 735. If the solutions are not equivalent and they are not undefined, in step 740, then P1, P2, and P3 are not collinear. If the solutions are undefined, in step 740, then the three points lie on a horizontal or vertical line. In step 755, if the x coordinates of the three points are equivalent, then P1, P2, and P3 lie on a vertical line. If the y coordinates of the three points are equivalent in step 765, then P1, P2, and P3 lie on a horizontal line. Once a determination as to collinearity is made, the filtering processes described in FIGS. 5 and 6 can continue.

In conclusion, the present invention supports the addition of control points to create more precise splines. When drawing software modules add control points to manipulate splines, the added points also increase the number of calculations that must be performed. The filtering techniques illustrated in the foregoing exemplary embodiment allow for the addition of control points in an efficient manner. By filtering redundant control points, only points significant to the manipulation of the spline are used in performing the calculations. Accordingly, the present invention improves the performance of drawing software modules without detracting from the ability to draw complex and precise splines.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalents thereof. For instance, other filtering techniques can be employed to identify and eliminate redundant control points to improve the performance of the drawing software module.

What is claimed is:

1. A method for efficiently creating a spline that connects a first object and a second object comprising the steps of:
   connecting the first object and the second object with a line segment;
   placing initial control points along the line segment;
   creating a proposed spline adjacent to the initial control points;
   refining the position of the proposed spline by adding control points;
   identifying a useless control point;
   isolating the useless control point;
   identifying a replaced control point; and
   isolating the replaced control point.

2. The method of claim 1, further comprising the step of creating a revised spline from the initial control points and added control points that have not been isolated.

3. The method of claim 1, further comprising the step of selecting the first object and the second object.

4. The method of claim 1, further comprising the step of drawing the first object and the second object.

5. The method of claim 1, wherein the line segment connecting the first object and the second object comprises a plurality of smaller line segments.

6. The method of claim 5, wherein the plurality of smaller line segments are orthogonal.

7. The method of claim 1, wherein the step of identifying a useless control point comprises:
   identifying a new control point;
   identifying a first old control point on one side of the new control point and a second old control point on the other side of the new control point;
   if there is no third old control point present or the third old control point is collinear with the first old control point and the second old control point, classifying the new control point as useless backward,
   if the third old control point is not collinear with the first old control point and the second old control point, classifying the new control point as not useless;
   if the new control point is useless backward, there is a fourth old control point, and the fourth old control point is collinear with the first old control point and the second old control point, classifying the new control point as useless; and
   if there is no fourth old control point or the fourth old control point is not collinear with the first old control point and the second old control point, classifying the new control point as not useless.

8. The method of claim 1 wherein the step of identifying a replaced control point comprises:
   identifying a first initial control point adjacent to a new control point;
   identifying a second initial control point and a third initial control point on either side of the first initial control point and the new control point; and
   if the first initial control point, the second initial control point, and the third initial control point are collinear, designating the first initial control point as replaced.

9. A computer-readable medium having computer-executable instructions for performing the steps recited in claim 1.

10. A method for efficiently creating a spline that connects a first object and a second object comprising the steps of:
    connecting the first object and the second object with a line segment;
    placing initial control points along the line segment;
    creating a proposed spline adjacent to the initial control points;
    refining the position of the proposed spline by adding control points; and
    filtering a useless control point.

11. The method of claim 10, further comprising the step of creating a revised spline from the initial control points and added control points that have not been isolated.

12. The method of claim 10, further comprising the step of selecting the first object and the second object.

13. The method of claim 10, further comprising the step of drawing the first object and the second object.

14. The method of claim 10, wherein the line segment connecting the first object and the second object comprises a plurality of smaller line segments.

15. The method of claim 14, wherein the plurality of smaller line segments are orthogonal.

16. The method of claim 10, wherein the step of filtering a useless control point comprises:
    identifying a new control point;
    identifying a first old control point on one side of the new control point and a second old control point on the other side of the new control point;
    if there is no third old control point present or the third old control point is collinear with the first old control point and the second old control point, classifying the new control point as useless backward,
    if the third old control point is not collinear with the first old control point and the second old control point, classifying the new control point as not useless;
    if the new control point is useless backward, there is a fourth old control point, and the fourth old control point is collinear with the first old control point and the second old control point, classifying the new control point as useless; and
    if there is no fourth old control point or the fourth old control point is not collinear with the first old control point and the second old control point, classifying the new control point as not useless.

17. A computer-readable medium having computer-executable instructions for performing the steps recited in claim 10.

18. A method for efficiently creating a spline that connects a first object and a second object comprising the steps of:

connecting the first object and the second object with a line segment;

placing initial control points along the line segment;

creating a proposed spline adjacent to the initial control points;

refining the position of the proposed spline by adding control points; and filtering a replaced control point.

19. The method of claim 18, further comprising the step of creating a revised spline from the initial control points and added control points that have not been filtered.

20. The method of claim 18, further comprising the step of selecting the first object and the second object.

21. The method of claim 18, further comprising the step of drawing the first object and the second object.

22. The method of claim 18, wherein the line segment connecting the first object and the second object comprises a plurality of smaller line segments.

23. The method of claim 22, wherein the plurality of smaller line segments are orthogonal.

24. The method of claim 18, wherein the step of filtering a replaced control point comprises:

identifying a first initial control point adjacent to a new control point;

identifying a second initial control point and a third initial control point on either side of the first initial control point and the new control point; and if the first initial control point, the second initial control point, and the third initial control point are collinear, designating the first initial control point as replaced.

25. A computer-readable medium having computer-executable instructions for performing the steps recited in claim 18.

* * * * *

UNITED STATES PATENT AND TRADEMARK OFFICE
CERTIFICATE OF CORRECTION

PATENT NO.    : 6,654,016 B1                                                                    Page 1 of 1
DATED         : November 25, 2003
INVENTOR(S)   : Craig Hobbs It is certified that error appears in the above-identified patent and that said Letters Patent is hereby corrected as shown below:

Drawings,
Sheet 4 of 8, FIG. 3B, insert -- Control Points -- above "FIG. 3B" as the title.

Signed and Sealed this

Twenty-first Day of June, 2005

JON W. DUDAS
*Director of the United States Patent and Trademark Office*